United States Patent Office 3,350,233
Patented Oct. 31, 1967

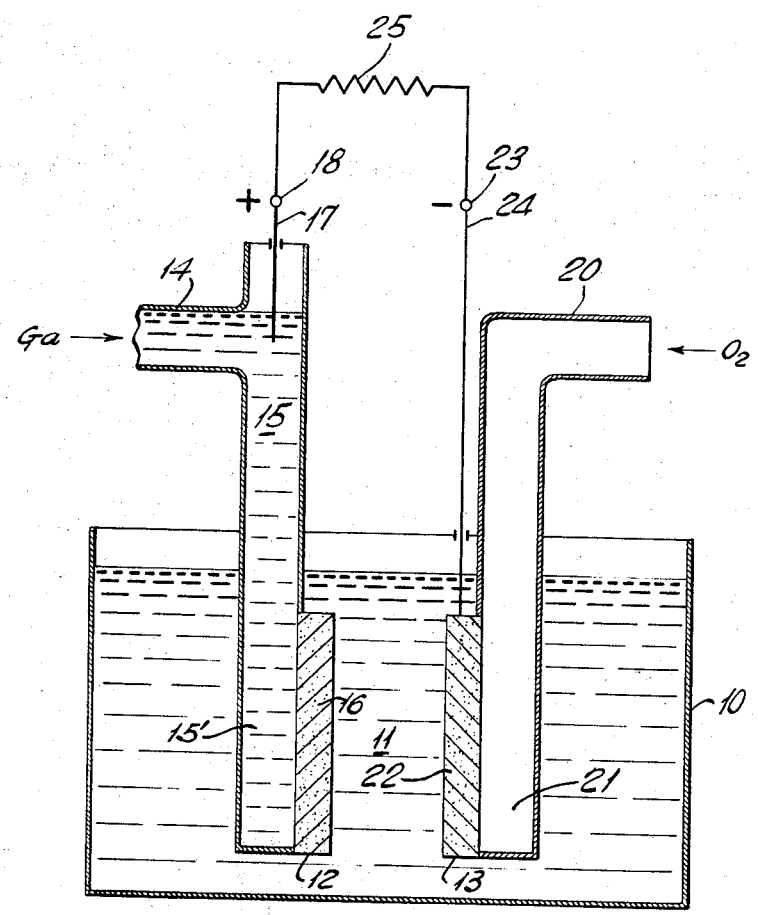

3,350,233
ELECTROCHEMICAL LOW-TEMPERATURE
FUEL CELL
Heinz-Günther Plust, Spreitenbach, Aargau, and Carl
Georg Telschow, Zurich, Switzerland, assignors to
Aktiengesellschaft Brown, Boveri & Cie., Baden, Switzerland
Filed Aug. 20, 1963, Ser. No. 303,267
Claims priority, application Switzerland, Aug. 27, 1962,
10,163/62
8 Claims. (Cl. 136—86)

The present invention relates to fuel cells which directly convert the energy freed by the chemical reaction of a suitable fuel with an oxidant (air, oxygen) into electrical energy, the general object of the invention being the provision of an improved electrical generator of this type.

There are already known electrochemical low-temperature fuel cells in which a gaseous fuel, such as hydrogen reacts on the anode electrode and in which an oxidant-supplying electrode is used as a cathode electrode, a suitable ionic conducting medium or electrolyte being disposed in contact with both of said electrodes.

Fuel cells are likewise known which utilize liquid fuels for the electrochemical reaction. More particularly, it has been proposed that the fuels take the form of suitable organic compounds, for example alcohols, dissolved in the electrolyte, or of solutions of metals in other metals, as for example in the case of the known sodium amalgam cell.

The disadvantages of fuel cells utilizing gaseous fuels are due mainly to the fact that electrodes made of an electrochemically active material or comprising a catalyst must be used, and that these electrodes must comprise pores of definite and critical size and above all must be homeoporous throughout because of the critical three-phase metal-electrode-gas contact or boundary condition to be established. Besides, special and complicated provisions must be adopted in order to ensure a substantially complete gas reaction, in the interest of providing a cell of adequate efficiency. Another requirement is that the fuel such as hydrogen must be very pure so that the effectiveness of the electrode is not impaired. Finally, gaseous fuels are very inconvenient as regards storage on account of the mol volume of the fuel or gases as well as their valency, for example in the case of hydrogen.

Fuel cells of the type utilizing a fuel in the form of liquid organic compounds, such as alcohols, are considerably more advantageous from the standpoint of fuel storage. On the other hand, only relatively low current densities can be attained with such cells on account of the complex electrochemical reaction mechanism involved. Further difficulties arise as a result of the fact that the electrolyte in which the fuels are dissolved is made unusable by the reaction products, for example $CO_2$, and that the counterelectrode is also impaired by the electrolyte as a result of secondary reaction, as well as due to polarization and other undesirable effects.

Known fuel cells in which liquid metal alloys, above all alkali metals, such as sodium, potassium and cesium dissolved in mercury, are used as the fuel, while exhibiting high current density and electromotive force on account of the electropositive metals being used, have other disadvantages greatly limiting their successful use in practice. Besides the poisonous nature of the mercury and the enormous reactivity of the alkali metals, both of which make the cells very difficult to handle, the relatively low solubility of the alkali metals in the mercury, amounting to only about 5 percent by weight, constitutes a major shortcoming and disadvantage. Moreover, in order to overcome any difficulty with storage, the mercury must be kept in circulation, as a result of which any alkali metal consumed must be replaced. Such provisions are costly in view of the circulatory devices and as a result of the special mercury-alkali metal reaction chamber required, and because furthermore a heat exchanger is necessary to remove the positive heat of reaction.

Accordingly, among the more specific objects of the present invention is the provision of an improved fuel cell of the type referred to by which the foregoing and related difficulties and drawbacks are substantially eliminated; which, in comparison with the prior devices of this type has a substantially increased fuel storage capacity; which will generate an increased output potential difference or electromotive force; which will require no critical three-phase contact or equilibrium to be set up between the electrode metal, the electrolyte and the fuel; which will require only a relatively thin and chemically inert porous spacer separating the fuel from the electrolyte; which is devoid of any strict requirement as to the porosity or pore distribution of the separator or reaction electrodes; and which enables the use of a fuel requiring no special purification prior to use.

The invention, both as to the foregoing and ancillary objects as well as novel aspects thereof, will be better understood from the following detailed description, taken in conjunction with the accompanying drawing forming part of this specification and which illustrates schematically a fuel cell constructed in accordance with the principles of the invention.

With the foregoing objects in view, the improved fuel cell according to the present invention comprises essentially means to provide a supply or body of liquid gallium serving as fuel for the electrochemical reaction and forming the anode electrode of the cell, an oxygen or air electrode for the oxidant supply, and an ionic conducting medium or electrolyte being in contact with both said electrodes. There is produced in a cell of this construction, as a result of the electrochemical reaction between the continuously supplied liquid gallium fuel and of the air or oxygen, an electrical potential difference between the gallium body forming the anode electrode and the oxygen or air electrode forming the cathode electrode which may be utilized for the energization of an electrical load or consuming device connected to said electrodes.

The new effects and results of the invention will become further apparent from the following description in reference to the drawing.

In the drawing, numeral 10 denotes a container filled with an electrolyte 11 serving as an ionic conducting medium and consisting, by way of example, of a 40 percent liquid solution of potassium hydroxide. An anode member 12 and a cathode member 13 are immersed in the electrolyte in spaced relation to one another. The fuel used for the electrochemical reaction at the anode takes the form of a supply or body 15 of liquid gallium being fed through a tube 14 and separated on one side from the electrolyte by a porous separator 16 forming part of a fuel chamber 15'. The tube 14, the walls of the space or chamber 15' connected therewith, and the porous separator 16 are made of a material which is inert to or does not react with gallium and is not soluble therein. As an example, the tube 14 may consist of glass, the walls of the space 15 may consist of a synthetic material, such as methylmethacrylite plastic also known as plexiglass, and the porous separator 16 may be made of polyethylene, polyvinyl chloride, sintered glass, ceramic, or a metal which resists the electrolyte and is considerably more stable chemically than gallium, such for example as platinum, palladium or nickel. Further mounted in the tube 14 is a connecting lead 17 being in electrical contact with the gallium, on the one hand, and being conductively connected with the positive output electrode or anode 18 of the fuel cell, on the other hand.

The oxygen electrode 13 acting as the cathode electrode of the cell may comprise in a known manner a supply or inlet tube 20 which serves to admit the gaseous oxygen reactant and which opens into the gas space or chamber 21. The electrode member 22 separating the space 21 from the electrolyte 11 may be made of a porous metal or metal alloy which does not form any liquid alloy with the gallium at operating temperature. It has proved to be expedient to use graphite for the electrode 22 which is conductively connected with the negative terminal or cathode 23 of the cell through a lead 24. Terminals 18 and 23 may, in turn, be connected to an electrical consuming device shown in the form of a resistor 25 in the drawing.

The melting point of gallium is 28° C. In order to keep the gallium in the molten state, the feed tube 14 and/or the vessel 10 containing the electrolyte must be provided with heating devices if required. It is expedient to choose an operating temperature of about 50° C.

The operation of the fuel element is based on the utilization of the free energy resulting from the following reaction:

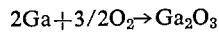

$$2Ga + 3/2 O_2 \rightarrow Ga_2O_3$$

This free reaction energy amounts to 235 kcal. which corresponds to a theoretical E.M.F. (electromotive force) of approximately 1.7 volts.

As pointed out, the gallium electrode is the anode, in accordance with the electrode-reaction $Ga \rightarrow Ga^{3+} + 3e^-$, and the oxygen or air electrode is the cathode, in accordance with the electrode-reaction $O_2 + 4e^- \rightarrow 2O^{2-}$. This leads to the overall electrochemical reaction as follows:

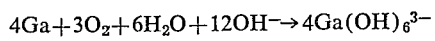

$$4Ga + 3O_2 + 6H_2O + 12OH^- \rightarrow 4Ga(OH)_6^{3-}$$

There is thus produced a reaction product in the form of a gallate solution which may be removed either from time to time by letting off the electrolyte 11 and replacing it with fresh electrolyte, or by continuously allowing new electrolyte to flow into the vessel 10 and draining off a corresponding quantity of electrolyte in which the gallate is dissolved. In this connection, it is expedient to recover the gallium from the collected gallate solution by an electrolytic process using cheap electrical energy.

The fuel cell may also be operated with an acid electrolyte, for example with sulphuric or hydrochloric acid of at least substantially optimum conductivity, i.e. an acid having a normal acid concentration of 7.5 N.

To this aim, the material of the oxygen electrode must be stable in the presence of hydrogen ions, for which purpose use of graphite as proposed is likewise suitable.

As compared to known electrochemical low-temperature fuel cells, the cell according to the invention exhibits numerous important advantages and desirable results some of which are set forth in the following.

A considerably more advantageous fuel storage can be attained with gallium in that its energy density amounts to 12 kwh./dm.³ compared with only 0.3 kwh./dm.³ for hydrogen compressed to 100 atmospheres. The fuel cell with liquid gallium as the fuel is accordingly particularly suitable for portable or mobile purposes such as for traction and the like uses or applications. In addition, the generated or open-circuit voltage with gallium as fuel is considerably higher than that obtained with a hydrogen cell, being about 1.7 volts compared to 1.2 volts of the latter.

The construction of the gallium electrode is very simple. Since there is no need to set up a critical three-phase contact or boundary between the electrode metal, the electrolyte and the fuel, the separator 16 between the fuel (gallium) and the electrolyte need only take the form of a relatively thin porous layer of inert material having relatively coarse and irregular pores and not being subject to any special requirements as regards the porosity of the material.

Furthermore, the gallium fuel reacts completely without any difficulty and the used fuel or reaction product, a gallate solution, can be very easily recovered.

Finally, gallium is a safe and easily handled fuel which does not require any special purification for the electrochemical reaction in the manner described.

In the foregoing, the invention has been described in reference to a specific illustrative device. It will be evident, however, that variations and modifications, as well as the substitution of equivalent parts and/or materials for those shown and described for illustration, may be made without departing from the broader scope and spirit of the invention encompassed by the appended claims. The specification and drawing are accordingly to be regarded in an illustrative rather than a restrictive sense.

We claim:

1. A method of operating a fuel cell including a first porous member, a second porous member spaced from said first member, and an electrolyte selected from the group comprised of liquid solutions of potassium hydroxide, sulphuric acid and hydrochloric acid and being in contact with both said members, said method consisting in feeding molten gallium to said first member, feeding a gaseous oxygen reactant to said second member, and operating said second member and the gallium metal as electrodes of said cell.

2. A method of operating a fuel cell including a first porous member, a second porous member forming an electrode of said cell and consisting of a conducting material incapable of forming a liquid alloy with gallium at the operating temperature of said cell, and an electrolyte selected from the group comprised of liquid solutions of potassium hydroxide, sulphuric acid and hydrochloric acid and being in contact with both said members, said method consisting in feeding molten gallium to said first member, feeding a gaseous oxygen reactant to said second member, and operating the gallium metal as cooperating electrode of said cell.

3. A method of operating a fuel cell as claimed in claim 2, wherein said second member consists of graphite.

4. A method of operating a fuel cell as claimed in claim 2, wherein said reactant consists of oxygen gas.

5. A method of operating a fuel cell as claimed in claim 2, wherein said reactant consists of air.

6. A method of operating a fuel cell including a container, a first porous member within said container, a second porous member of electrically conducting material within said container in spaced relation to said first member and forming an electrode of said cell, an electrolyte selected from the group comprised of liquid solutions of potassium hydroxide, sulphuric acid and hydrochloric acid and disposed within said container in contact with at least the opposed inner faces of said members, a first closed chamber including the outer face of said first member as a wall portion thereof, and a second closed chamber including the outer face of said second member as a wall portion thereof, said method consisting in feeding molten gallium to said first member via said first chamber, feeding a gaseous oxygen reactant to said second member via said second chamber, and operating the gallium metal as cooperating electrode of said cell.

7. A method of operating a fuel cell as claimed in claim 6, wherein said first porous member consists of a material inert to said electrolyte and is chemically substantially more stable than gallium, and said second porous member consists of a material incapable of forming a liquid alloy with gallium at the operating temperature of said cell.

8. A method of operating a fuel cell as claimed in claim 6, wherein said first member consists of a material selected from the group comprised of platinum, palladium and nickel, and said second member consists of graphite.

References Cited

UNITED STATES PATENTS

| 2,610,985 | 9/1952 | Schumacher | 136—86 |
| 3,031,518 | 4/1962 | Werner et al. | 136—86 |
| 3,245,836 | 4/1966 | Agruss | 136—86 |

WINSTON A. DOUGLAS, *Primary Examiner.*

H. FEELEY, *Assistant Examiner.*